UNITED STATES PATENT OFFICE.

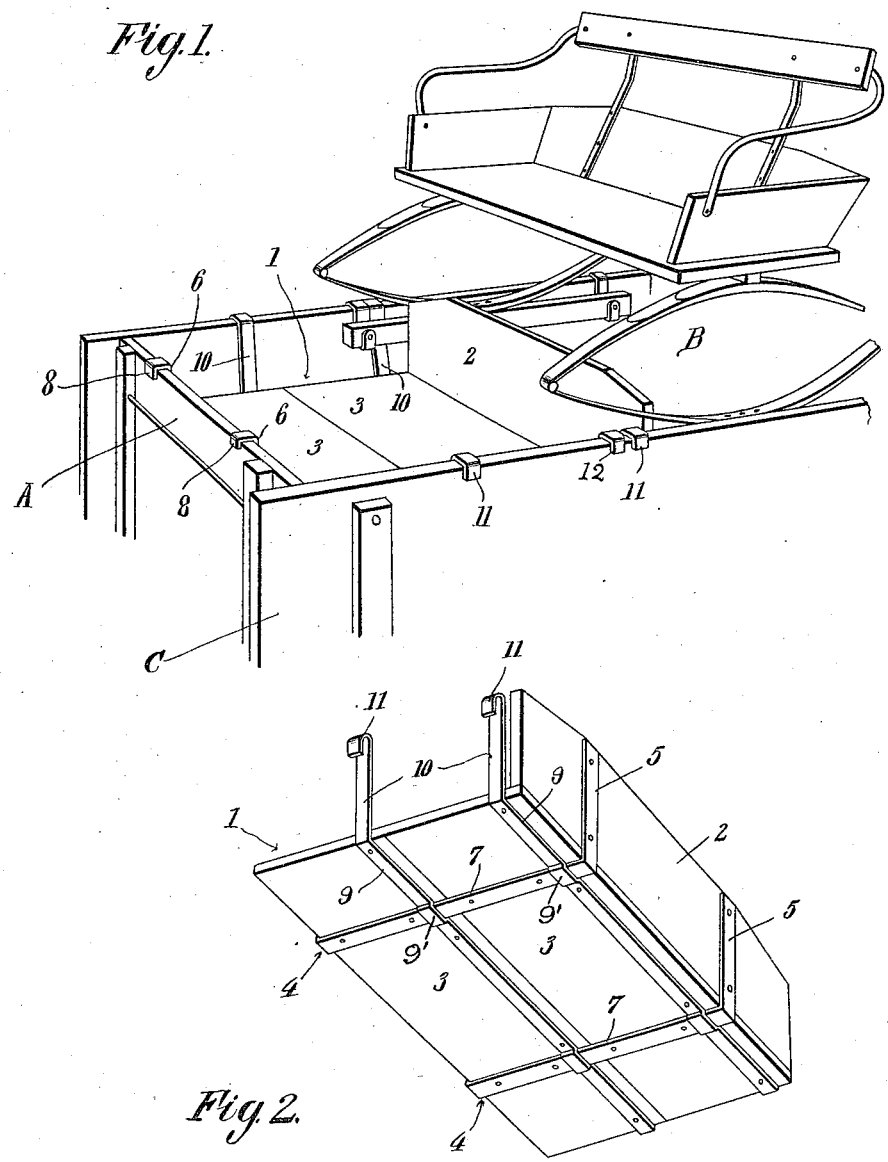

DEDRICK A. MAANUM, OF BENSON, MINNESOTA.

FOOT-REST FOR VEHICLES.

1,059,887.  Specification of Letters Patent.  Patented Apr. 22, 1913.

Application filed February 4, 1911. Serial No. 606,541.

*To all whom it may concern:*

Be it known that I, DEDRICK A. MAANUM, a citizen of the United States of America, residing at Benson, in the county of Swift and State of Minnesota, have invented new and useful Improvements in Foot-Rests for Vehicles, of which the following is a specification.

This invention relates to foot rests for vehicles, and has for an object to provide a rest which can be conveniently associated with the vehicle body and supported thereby in close proximity with the seat.

In the drawing, forming a portion of this specification and in which like numerals of reference indicate similar parts in the several views:—Figure 1 is a perspective view of a portion of a vehicle body showing the application of the foot rest thereto. Fig. 2 is an inverted perspective view of the foot rest.

My improved foot rest comprises a bottom member 1 and a back member 2, the bottom member being formed preferably of identically constructed sections 3 and being secured to the back member 2 by means of brace bars 4. The brace bars are constructed preferably, of flat sheet metal bent substantially in U-form so as to provide the vertical back portions 5, the vertical front portions 6 and the horizontal connecting portions 7, the portions 5 and 7 being secured to the bottom and back members 1 and 2 respectively, as clearly shown in Fig. 2 of the drawing. The front vertical portions 6 of the brace members are formed to provide forwardly extending hooks 8 which are adapted to be detachably engaged with the front end A of the wagon body B shown in Fig. 1 of the drawing. Bars 9 are secured to the underside of the member 1 and they extend upwardly from the sides of the member, as at 10, and as illustrated, their upper ends are formed to provide outwardly extending hooks 11 which are identical in construction with the hooks 8 previously described. The hooks 11 are adapted to be engaged with the sideboards C of the vehicle body. The said bars 9 at points adjacent to and to opposite sides of their medial portion are formed with outwardly and upwardly stamped recesses 9' whereby snugly receiving the brace bars 4 and disposing said brace bars with their upper surfaces of the bars 9 and tending to permanently serve as a reinforcement. When the hooks 8 and 11 are properly supported on the front A and sides C of the vehicle body the bottom member 1 of the foot rest will be supported above the bottom of the vehicle body and in such proximity with respect to the seat of the vehicle that will permit the occupant to readily place his feet thereon.

Detachably secured to the opposed faces of the side boards of the vehicle body are retaining members 12, said retaining members extending over and engaging with the opposed faces of the rearward hook member 10 of the bars 9 whereby upon excessive vibrations of the vehicle body, the said foot rest will be permanently retained in active position and be prevented from jolting out of place.

I claim:—

A foot rest for vehicles comprising a sectional horizontal bottom member, a vertically disposed back member having its lower longitudinal edge supported upon and flush with the rear longitudinal edge of one of the sections of the said bottom member, bars secured to the underside of the bottom member adjacent to and in spaced relation to the longitudinal edges thereof and provided at a point adjacent to and to opposite sides of their medial portions with outwardly and upwardly stamped recesses, said bars being formed adjacent their opposite ends to provide upstanding portions, the upper ends of said upstanding portions terminating in hooks to removably engage the side walls of said vehicle body, and connecting straps secured to and extending in spaced relation throughout the full transverse portion of the said sectional bottom member and fitting snugly within the said outwardly and upwardly stamped recesses of said bars, reinforcing the said bottom member, said straps being bent in substantially U-shaped configuration to provide vertical back and front horizontal portions, said front portion terminating in hooked ends, said back portion being secured to and extending throughout the full transverse width thereof and terminating flush with the upper longitudinal edge of said back member for securing the latter to the horizontal bottom member.

In testimony whereof I affix my signature in presence of two witnesses.

DEDRICK A. MAANUM.

Witnesses:
F. Z. STONE,
O. SOLAND.

Copies of this patent may be obtained for five cents each, by addressing the "Commissioner of Patents, Washington, D. C."